United States Patent
Oka

(10) Patent No.: US 6,999,834 B2
(45) Date of Patent: Feb. 14, 2006

(54) METHOD FOR MANUFACTURING A RECEIVER AND RECEIVER MANUFACTURED BY USING THE SAME METHOD

(75) Inventor: Manabu Oka, Minowa-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/778,538

(22) Filed: Feb. 17, 2004

(65) Prior Publication Data

US 2004/0230333 A1  Nov. 18, 2004

(30) Foreign Application Priority Data

Feb. 19, 2003 (JP) ............................. 2003-041288
Aug. 28, 2003 (JP) ............................. 2003-303956

(51) Int. Cl.
*G06F 19/00* (2006.01)

(52) U.S. Cl. ..................... 700/116; 700/292; 320/107; 340/31

(58) Field of Classification Search ................ 700/116, 700/115, 117, 292; 310/346, 344

See application file for complete search history.

(56) References Cited

U.S. PATENT DOCUMENTS

| | | | |
|---|---|---|---|
| 5,740,525 A | 4/1998 | Spears | |
| 6,507,273 B1 * | 1/2003 | Chang et al. | 340/3.1 |
| 6,509,870 B1 | 1/2003 | Matsushita et al. | |
| 6,794,849 B2 * | 9/2004 | Mori et al. | 320/107 |
| 6,820,205 B2 * | 11/2004 | Odaohhara et al. | 713/300 |
| 6,876,893 B2 * | 4/2005 | Kano et al. | 700/100 |
| 2002/0059009 A1 | 5/2002 | Kano et al. | |
| 2002/0173284 A1 | 11/2002 | Forrester | |

FOREIGN PATENT DOCUMENTS

| | | |
|---|---|---|
| EP | 1 376 866 A1 | 1/2004 |
| JP | A 2001-281322 | 10/2001 |

OTHER PUBLICATIONS

Moshe Nissim et al., "Storing and Reloading of Radio Tuning Data", Motorola Technical Developments, Motorola Inc., Jul. 1, 1995, p. 120.

* cited by examiner

*Primary Examiner*—Kidest Bahta
(74) *Attorney, Agent, or Firm*—Oliff & Berridge, PLC

(57) ABSTRACT

To facilitate the manufacture of an accurate receiver, a piezoelectric device manufacturer determines characteristic data, such as an approximate expression representative of a temperature characteristic of piezoelectric device and coefficients of the approximate expression, and stores it to a memory of a manufacturer's computer corresponding to a serial number of each piezoelectric device. The piezoelectric device manufacturer, ships a piezoelectric device to a vendor, transfers the characteristic data of the piezoelectric device to the vendor server through a communication network. The client, when the purchased piezoelectric device is mounted on an electronic appliance, reads out a serial number and inputs it to the client's computer. The client's computer acquires the characteristic data of the piezoelectric device corresponding to the serial number from the vendor server through the communication network, and writes it to a memory of the electronic appliance.

5 Claims, 8 Drawing Sheets

| Product number | Discrete data ||||||||
|---|---|---|---|---|---|---|---|---|
| | Temperature coefficient data |||| Electric characteristic test data ||| Manufacturing history data ||
| | Coefficient 1 | Coefficient 2 | Coefficient 3 | Coefficient 4 | Coefficient 1 | Coefficient 2 | Coefficient 3 | Shipment data / manufacturing lot / process history / lot yield / member used.... |
| MEA015215, | 4.563, | 5.323, | 2.563, | 3.583, | 1.653, | 1.250, | 4.855, | 2001.11.14, W7543, Line A, 98 ...... |
| MEA015216, | 4.221, | 6.321, | 1.652, | 0.525, | 1.666, | 1.305, | 4.231, | 2001.11.14, W7543, Line A, 98 ...... |
| ...... | | | | | | | | |

FIG. 6

METHOD FOR MANUFACTURING A RECEIVER AND RECEIVER MANUFACTURED BY USING THE SAME METHOD

BACKGROUND OF THE INVENTION

1. Field of Invention

The present invention relates to methods to manufacture a receiver, and more particularly to methods to manufacture a receiver suited to manufacture a GPS receiver or a cellular telephone having a GPS receiving function and to a receiver manufactured by using the same methods.

2. Description of Related Art

Recently, cellular telephones having GPS (Global Positioning System) receiving functions have been created along with the development of electronic technology. In the GPS functions, positioning signals are received and/or sent from three or more satellites at arbitrary locations of among nearly twenty four artificial satellites (GPS satellites) orbiting the earth every nearly twelve hours. Based upon the positioning signals, the distances to each satellite are determined to thereby determine a signal-receiving position from those distances.

The GPS satellites orbit the earth in a period of about twelve hours as noted above. Consequently, the positioning signal received from the GPS satellite at the terrestrial location fluctuates in frequency due to the Doppler effect. The amount of frequency fluctuation is different depending upon a relative velocity of the receiver and the GPS satellite. The fluctuation in the positioning signal from GPS satellite due to the Doppler effect can be determined by an operation based on the satellite orbit information previously stored by the GPS receiver and the location of the receiver. At the receiver, positioning is easy by making a correction to the fluctuation on the basis of a reference oscillator frequency. In the related art, as the GPS reference oscillator, a temperature compensated piezoelectric oscillator (Temperature Compensated Crystal Oscillator or TCXO) having a comparatively low fluctuation of oscillation frequency against ambient temperature change, is employed.

When receiving a GPS signal, there is a need to search the frequency ranges in which a satellite signal would be present until a satellite signal is received. Accordingly, in order to reduce the time from powering on the GPS receiver to the time that a satellite signal is captured, it is desirable to have a reference oscillator high in frequency accuracy. Ideally ±0.1 ppm or less is required. However, the usual TCXO has an oscillation frequency accuracy of nearly ±1.0 ppm to ±2.5 ppm at operating temperature range. In the case of using a TCXO, the frequency search range to capture positioning signals is broadened, requiring an increased time to capture a positioning signal. Moreover, the piezoelectric oscillator, such as TCXO, usually suffer from aging, thus raising a problem of increased errors.

In the related art, there is a proposal of a method of searching a positioning signal by the use of a usual piezoelectric oscillator, instead of a TCXO (Simple Packaged Crystal Oscillator: SPXO) including an AT-cut quartz resonator (hereinafter, AT resonator) as a reference oscillator, the frequency accuracy of reference oscillation frequency being substantially ±0.1 ppm or less (See e.g., JP-A-2001-281322). In the method described in JP-A-2001-281322, the curve representing a frequency-temperature characteristic of piezoelectric resonator is approximated as a quartic function having a variable of temperature, to detect an ambient temperature of the oscillator, whereby a frequency correction amount is determined depending upon the detected temperature and the function (approximate expression).

Generally, the SPXO using an AT-cut quartz resonator has a change rate of oscillation frequency in the usual operating temperature range of nearly four times or more that of the TCXO. Consequently, in the case of employing an SPXO as a reference oscillator for a GPS receiver, there is a necessity to measure the resonator for a frequency-temperature characteristic and to determine an approximate expression as noted above. In the related art, for the frequency-temperature characteristic, the GPS receiver maker, after purchasing a piezoelectric oscillator, measures frequency-temperature characteristics on the individual piezoelectric oscillators to thereby determine an approximate expression. Consequently, much labor and time is required to manufacture a GPS receiver.

Recently, there are widespread piezoelectric oscillators incorporating a piezoelectric resonator and an IC, such as an oscillator circuit, within one package. It can be considered that the characteristic data concerning a piezoelectric oscillator including the foregoing approximate expression and the coefficient of the approximate expression is stored in the IC memory incorporated within the piezoelectric oscillator package and provided to the receiver maker. However, in the case of adding a memory function to the oscillation IC, the IC increased in size proportional to the circuit addition related to data input/output and the number of bits for storage, thus making difficult to provide a piezoelectric oscillator satisfying the requirement of the client, such as cost and size-reduction requirement. Also, once the information concerning the frequency-temperature characteristic specific to a piezoelectric oscillator written in the memory within an oscillation IC is moved to a GPS receiver memory, from then on it is not necessary to use the memory within the oscillation IC, thus raising a drawback of much uselessness.

SUMMARY OF THE INVENTION

The present invention has been made to address the foregoing disadvantage in the related art, and thereof to facilitate the manufacture of an accurate receiver.

Also, the present invention avoids a piezoelectric oscillator requiring high frequency accuracy that will increase the size or cost of the receiver.

The piezoelectric oscillators are mounted to output reference frequencies on many electronic appliances. Recently, various electronic appliances have had their performance improved to have larger memories and high-performance operation processing units. Piezoelectric oscillator makers, when manufacturing a piezoelectric oscillator, measure various characteristic data including the frequency-temperature characteristic of each piezoelectric resonator and piezoelectric oscillator. They have abundant facilities and measurement experience and have the capability to obtain accurate characteristic data. Accordingly, the receiver maker can store the characteristic data gained by the piezoelectric oscillator maker in a GPS receiver memory. Thus, the piezoelectric oscillator maker can provide a small-sized oscillator having an IC with a minimum memory. The receiver maker does not have to measure characteristic data, owing to the provision of measurement data from the oscillator maker. Thus, cost reduction can be achieved for both the oscillator maker and the receiver maker.

An aspect of the present invention, is a method to manufacture a receiver incorporating a piezoelectric device, including: storing characteristic data of a plurality of piezoelectric devices in a server, corresponding the characteristic data to identifying markers put on the each piezoelectric device; and reading the identifying marker when the piezoelectric device is assembled in a receiver, and receiving the corresponding characteristic data from the server through a communication network depending upon the read-out identifying marker and writing the characteristic data to a storage section of the receiver.

In an aspect of the present invention, the characteristic data of a piezoelectric device may be supplied through any suitable communication network, such as the Internet. Consequently, the receiver maker is not required to measure, by itself, for characteristic data of a piezoelectric device. Instead the characteristic data is gained through the communication network to the storage section of the receiver and an accurate receiver is easily and swiftly manufactured. Because the piezoelectric device is not required to provide a memory for storing characteristic data, size reduction is possible thus satisfying the client's desire for size reduction.

A method for manufacturing a receiver according to an aspect of the invention incorporating a piezoelectric device, includes: acquiring a recording medium that has recorded characteristic data of a plurality of piezoelectric devices corresponding to identifying markers put on the each piezoelectric device, together with the piezoelectric devices; reading the identifying marker when the piezoelectric device is assembled in a receiver, and reading the characteristic data corresponding to the read-out identifying marker from the recording medium and writing the characteristic data to a storage section of the receiver.

In an aspect of the present invention, when purchasing a piezoelectric device, a recording medium is provided which records the characteristic data of the piezoelectric device. This recording medium may be any suitable recording medium, such as a recording medium to be read by a computer, such as a flexible disc, a CD-ROM, a DVD-ROM or a memory card using a non-volatile memory. Otherwise, the recording medium may be provided as a paper describing a characteristic so that it can be read out by a scanner.

The characteristic data may be acquired during manufacturing the piezoelectric device. The piezoelectric device maker (manufacturer), having abundant facilities and experience, can obtain accurate characteristic data easily and positively. The server may be set up at a vendor for the piezoelectric device so that the characteristic data corresponding to the identifying marker acquired during manufacturing the piezoelectric device, can be sent to the server through the communication network. The receiver maker does not necessarily purchase a piezoelectric device directly from the manufacturer of the piezoelectric device. Accordingly, when the piezoelectric device seller is a trading company or the like, a swift response is made possible by providing a server to such a vendor.

A receiver according to an aspect of the invention is characterized by being manufactured by using the foregoing methods to manufacture a receiver.

BRIEF DESCRIPTION OF THE DRAWINGS

FIG. 6 is a schematic showing one example of the data stored in a vendor server;

DETAILED DESCRIPTION OF EXEMPLARY EMBODIMENTS

Exemplary embodiments of a manufacturing method for a receiver and a receiver manufactured by the methods according to the present invention will be explained in detail with reference to the attached figures.

Figure 1:
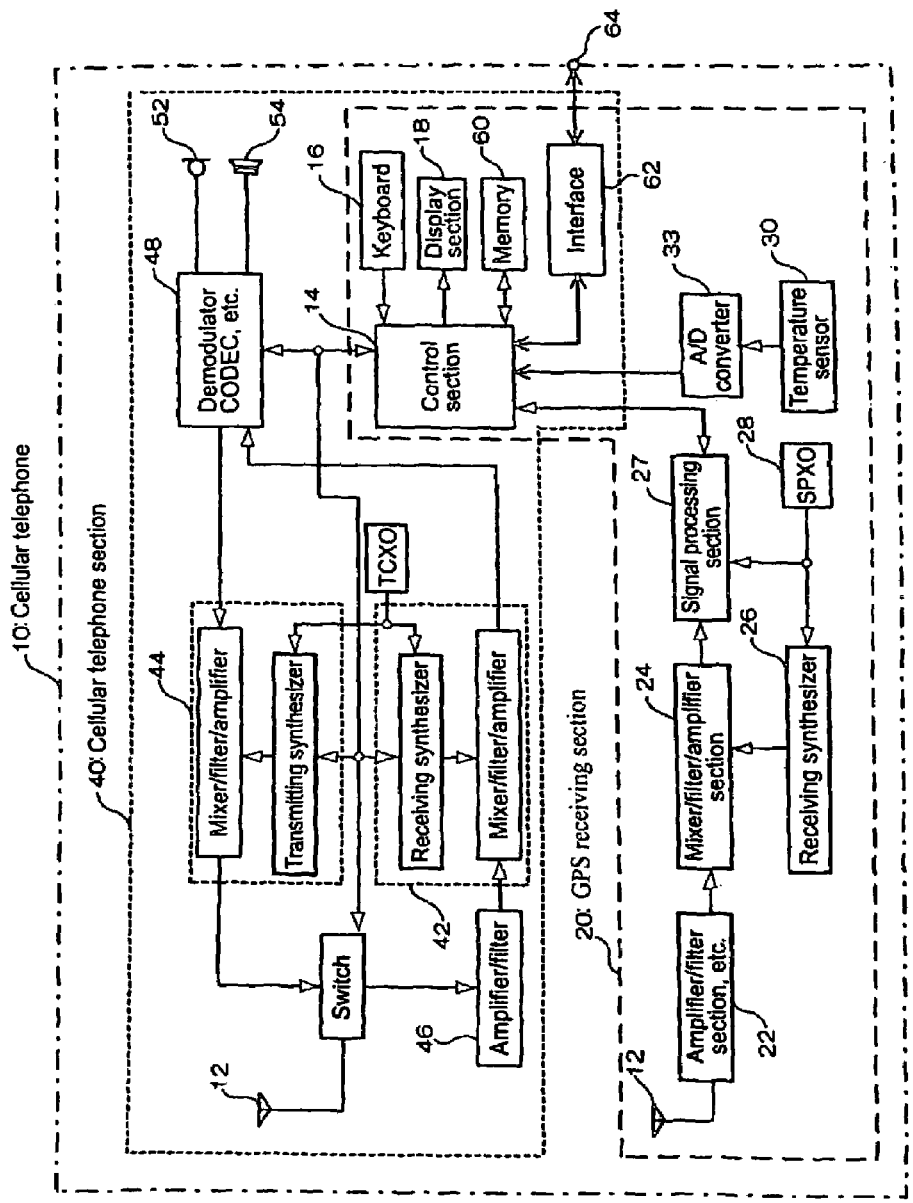
FIG. 1 is a block schematic of a receiver according to an exemplary embodiment of the present invention.

FIG. 1 is a schematic showing an example of a digital cellular telephone having a GPS receiving function that is a receiver according to an exemplary embodiment of the present invention. In FIG. 1, a cellular telephone 10 has a GPS receiving section 20 and a cellular telephone section 40. The GPS receiving section 20 has an amplifier/filter section 22, a mixer/filter/amplifier section 24, a receiving synthesizer 26, a signal processing section 27, an SPXO 28 serving as a reference oscillator, a temperature sensor 30, and an A/D converter 33.

The amplifier/filter section 22 and mixer/filter/amplifier section 24 amplify/select a positioning signal from a GPS satellite through an antenna 12 and frequency-convert it on the basis of a signal from the reference oscillator SPXO 28. Meanwhile, the signal processing section 27 performs a demodulation process on a GPS signal by using the signal from the mixer/filter/amplifier section 24 and the signal from the SPXO 28, on the basis of the information from the control section 14 configured by a CPU. The result is output to the control section 14. The temperature sensor 30, to detect an ambient temperature of the SPXO 28, is provided close to the SPXO 28, to input a detection signal to the control section 14 through an A/D converter 33. The control section 14, on the basis of the detected temperature of the temperature sensor 30, determines a correction amount for an oscillation frequency of the SPXO 28 as discussed hereinafter and provides it to the signal processing section 27, and further controls the receiving synthesizer 26 to remove a frequency fluctuation due to temperature of the SPXO 28. Meanwhile, the control section 14 operates a current position (positioning signal receiving position) of the cellular telephone 10 on the basis of an output signal of the signal processing section 27.

Incidentally, the temperature sensor 30 may be provided on a side of the package or within the package of the SPXO 28. Due to this, the operating temperature of the SPXO 28 can be detected correctly, making it possible to enhance the correction accuracy for the oscillation frequency of the SPXO 28. Accordingly, it is possible to narrow the frequency search range to capture positioning signals, and hence to reduce the search time for a positioning signal.

The cellular telephone section 40 shows a schematic configuration of a digital-schemed cellular telephone apparatus. The cellular telephone section 40 is configured with an antenna 12 to receive an RF signal from a cellular-telephone base station (not shown), an amplifier/filter 46 to amplify a slight signal from the antenna, a receiving section 42 configured with a mixer/filter/amplifier and a receiving synthesizer, a transmitter section 44 configured with a mixer/filter/amplifier and a transmitting synthesizer, a demodulator/CODEC section 48 to modulate and demodulate a digital signal, a control section 14 to control the cellular telephone 10, a microphone 52 serving as an interface to an operating person, a speaker 54, a keyboard section 16, a display section 18, and an interface 62. The interface 62 is connected to a connector 64 provided on the cellular telephone 10 and to the control section 14, thus allowing data exchange between the cellular telephone 10 and the outside.

The control section 14 is connected with a keyboard section 16 serving as an input section, a display section 18 structured by a liquid-crystal panel or the like and a memory 60, thus allowing control of the overall operation of the digital cellular telephone having a GPS receiving function. The keyboard section 16, capable of inputting a telephone number or characters, is adapted to provide various commands to the control section 14. The display section 18 is made to display an incoming telephone number, mail or image, and a current position based on the positioning signal received by the GPS receiving section 20. The memory 60 is stored with not only a program to operate the GPS receiving section 20 but also various programs to execute each function for the cellular telephone 10. Also, the memory 60 has user information stored, such as telephone directory and various histories, and GPS map information, SPXO 28 characteristic data (approximate expression on the curve representing a temperature-frequency characteristic, and coefficients in the approximate expression), a dictionary and so on. The characteristic data of SPXO 28 is written to the memory 60 through the interface 62 and connector 64, in the manufacturing process of the cellular telephone 10, as hereinafter described. Of course, the approximate expression may be written in a form given with coefficients.

Figure 2:
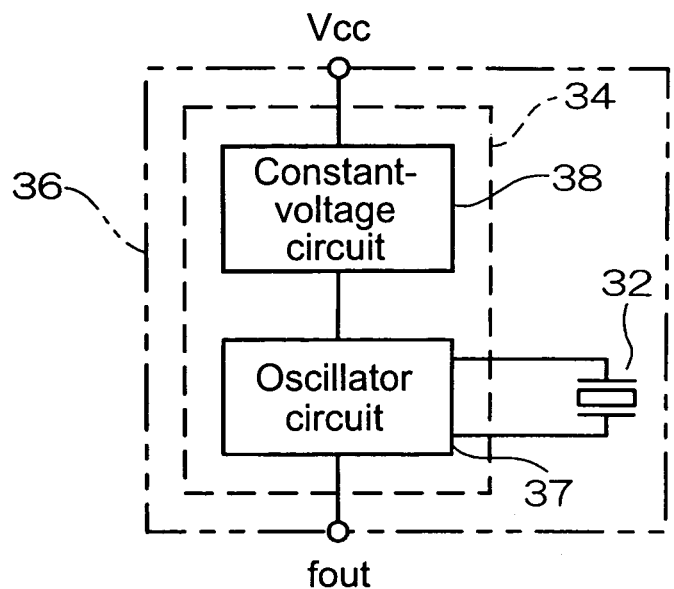
FIG. 2 is a block schematic showing one example of an SPXO.

The reference oscillator SPXO 28, in the exemplary embodiment, is configured as shown in FIG. 2, i.e. structured by a piezoelectric resonator 32 formed by an AT-cut quartz plate or the like and an IC 34, which are accommodated within one package 36. The IC 34 has an oscillator circuit 37 to oscillate the piezoelectric resonator 32 and a constant-voltage circuit 38. The constant-voltage circuit 38 is connected to a power source through a terminal $V_{CC}$, to supply a constant voltage to the oscillator circuit 37 and serve to reduce or prevent oscillation frequency fluctuation due to power voltage fluctuation. The output of the oscillator circuit 37 supplies an oscillation frequency to the receiving synthesizer 26 and signal processing section 27 through an output terminal $f_{out}$. The piezoelectric resonator 32 and the IC 34 may be accommodated in separate packages.

Figure 4:
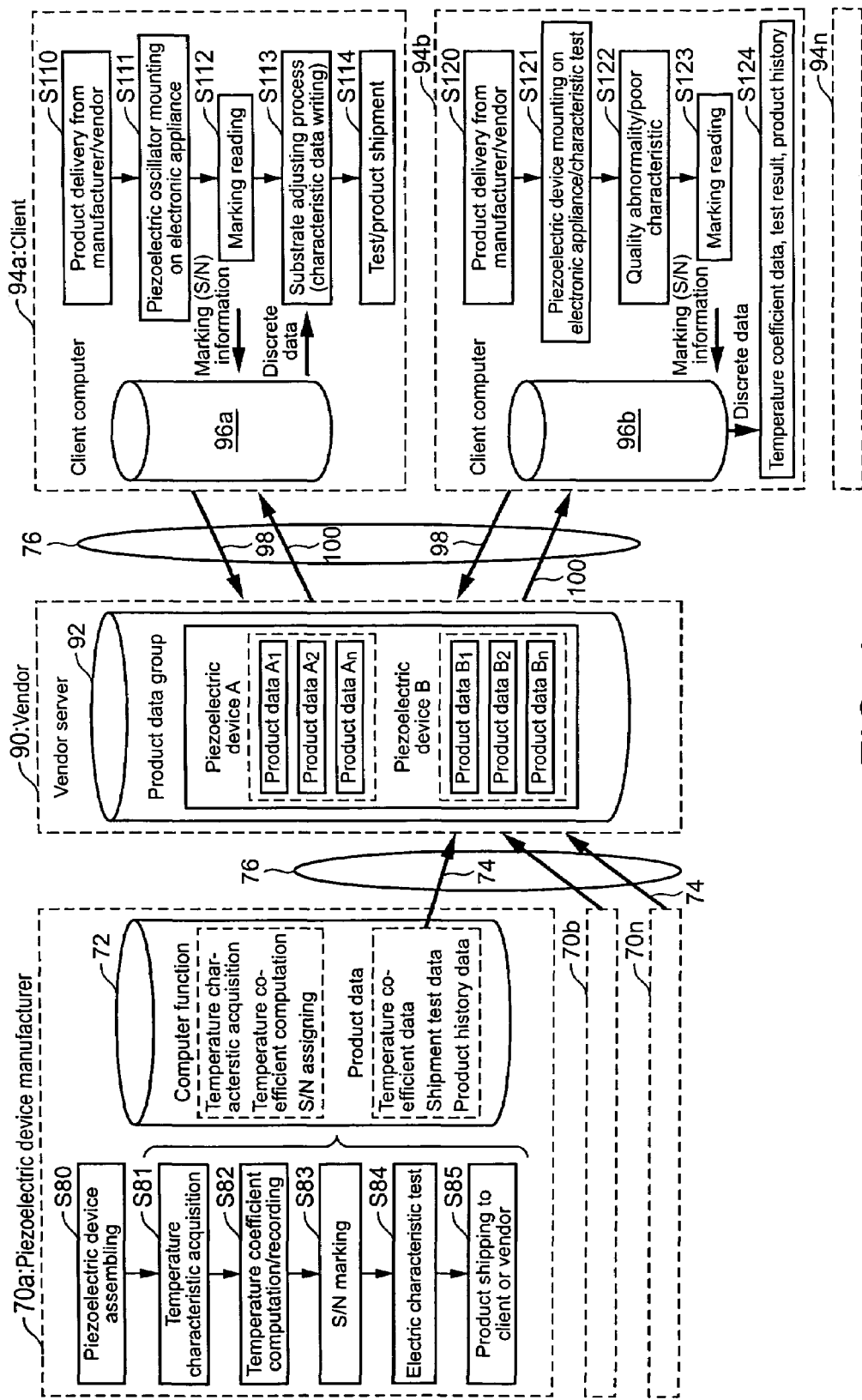
FIG. 4 is a schematic explaining a manufacturing method for a receiver according to the exemplary embodiment.

The characteristic data of the SPXO 28 is acquired as shown in FIG. 4 and written to the memory 60 of the cellular telephone 10 through the interface 62 and connector 64. In FIG. 4, the characteristic data of the SPXO 28 is obtained from the manufacturer of the SPXO 28 (piezoelectric device manufacturer) 70 (70a to 70n). Specifically, each piezoelectric device manufacturer 70, after assembling the piezoelectric device (SPXO 28, in the exemplary embodiment) (step S80), measures the piezoelectric device, one at a time, for the relationship between temperature and frequency and acquires a frequency-temperature characteristic (temperature characteristic) (step S81). The measured relationship data between temperature and frequency is input to a manufacturer computer 72. The manufacturer computer 72 determines a frequency-temperature characteristic (relationship between a temperature and a frequency deviation) as shown in FIG. 5.

Figure 5:
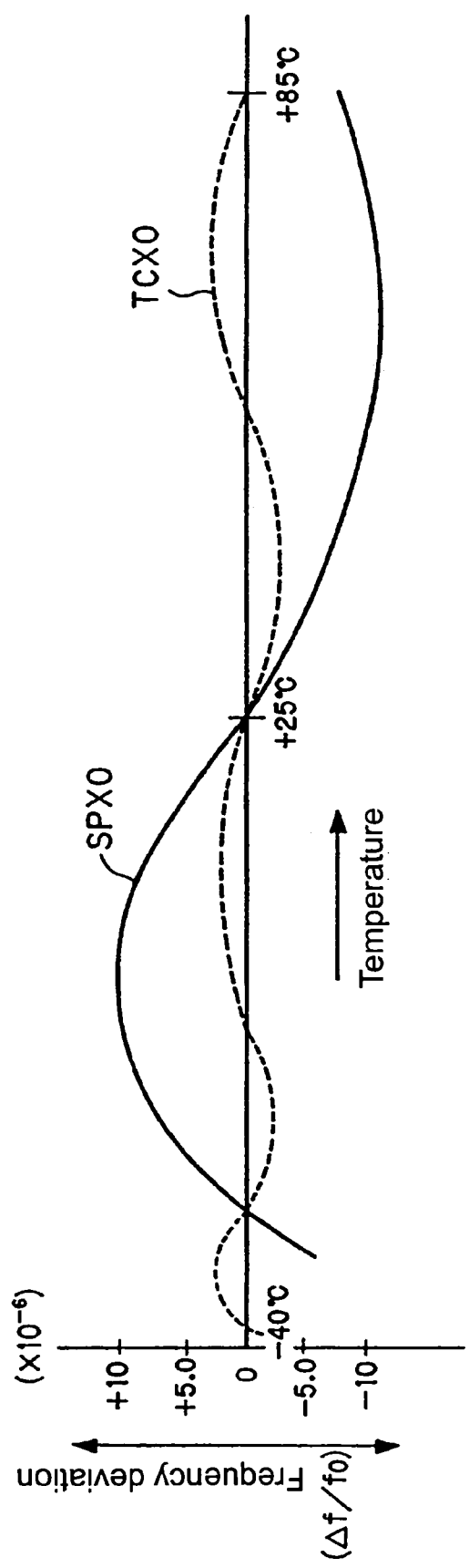
FIG. 5 is a schematic comparing the frequency-temperature characteristic of the SPXO and TCXO.

The SPXO 28 using the AT resonator has great frequency change and is inferior in temperature characteristic, as shown by the solid line in FIG. 5, as compared to the TCXO (temperature compensated piezoelectric oscillator) shown by the broken line. Namely, the TCXO can be adjusted in oscillation frequency deviation ($\Delta f/f_0$) to within $\pm 2.5$ ppm ($\pm 2.5 \times 10^{-6}$) or less in a temperature range of $-40°$ C. to $+85°$ C. Herein, $f_0$ is an oscillation frequency of the piezoelectric device at $+25°$ C. and $\Delta f$ is a difference between the oscillation frequencies f and $f_0$ of the piezoelectric device at a arbitrary temperature, i.e., $$\Delta f = f - f_0 \qquad \text{Equation 1}$$

However, the SPXO 28 has a frequency deviation ($\Delta f/f_0$) of approximately 10 ppm that is as great as about four times that of TCXO in the same temperature range. However, because the temperature characteristic of the SPXO using an AT resonator can be accurately expressed by a quartic approximate expression having a variable of temperature, the oscillation frequency deviation at $-40°$ C. to $+85°$ C. can be predicted within approximately $\pm 0.1$ ppm. Accordingly, in the exemplary embodiment, the temperature coefficient (coefficient on each degree of the approximate expression) representative of a frequency-temperature characteristic specific to each piezoelectric device is determined using the method of least squares or the like by the manufacturer's computer 72, and stored (recorded) in the storage section of the manufacturer computer 72 (step S82).

Provided that the reference temperature is $T_0$, the arbitrary temperature in a temperature range of $-40°$ C. to $+85°$ C. is T, the coefficients in the fourth to first degrees (temperature coefficients) are A, B, C, D, and the offset amount at the reference temperature $T_0$ is E, then the approximate expression representative of the SPXO temperature characteristic shown in FIG. 5 can be expressed as:

$$(\Delta f/f_0) = A(T-T_0)^4 + B(T-T_0)^3 + C(T-T_0)^2 + D(T-T_0) + E \qquad \text{Equation 2}$$

where $f_0$ is the SPXO oscillation frequency at the reference temperature $T_0$ and $\Delta f$ is the frequency deviation determined by $\Delta f = f - f_0$ when the SPXO oscillation frequency is taken f at the arbitrary temperature.

Figure 3:
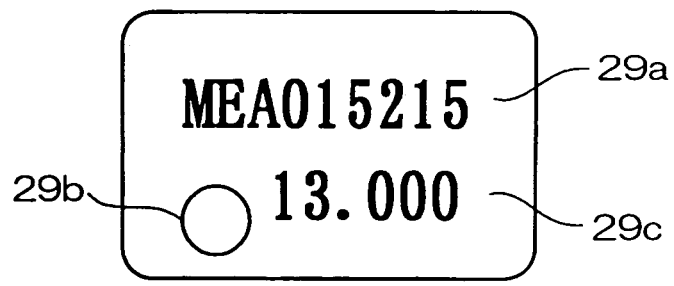
FIG. 3 is a schematic showing one example of an identifying marker according to an exemplary embodiment of the invention.

Each piezoelectric device, whose temperature characteristics and temperature coefficients have been determined, are respectively assigned with serial numbers (S/N) by the manufacturer's computer 72. As shown in step S83 of FIG. 4, those may be indicated (marked) on package surfaces together with oscillation frequencies, by a not-shown printer. FIG. 3 shows one example of indication made on the piezoelectric device package. The upper indication 29a in FIG. 3 is a serial number. Meanwhile, in the exemplary embodiment, the lower mark ○ 29b represents a first-pin position on the SPXO 28 while the lower right numeral 29c represents an oscillation frequency of the SPXO 28.

The serial number (S/N) associated with the SPXO 28 is an identification marker to identify each piezoelectric device, and is different for each piezoelectric device. The foregoing characteristic data, including temperature coefficients, is written to the storage section of the manufacturer computer 72, correspondingly to the serial number. Thereafter, the piezoelectric device is measured for electric characteristics (step S84) and stored in the manufacturer computer 72. Incidentally, the manufacturer computer 72 plays a role as a server as hereinafter described, to output characteristic data onto a communication network 76 upon request of a client.

The piezoelectric device (SPXO 28) thus manufactured is shipped to a client 94 (94a to 94n) or a piezoelectric device vendor 90, as shown in step S85. Meanwhile, the piezoelectric device manufacturer 70, when shipping a piezoelectric device to the vendor 90, transfers the characteristic data, shipment test data, manufacturing history data, etc. of the shipped piezoelectric device corresponding to the serial number, from the manufacturer's computer 72 to a vendor server 92 through a communication network 76, such as the Internet, as shown at the arrow 74. The data is stored in the vendor server 92, corresponding to the serial numbers. In the vendor server 92, are stored characteristic data and the like of various piezoelectric devices A ($A_1$ to $A_n$), B ($B_1$ to $B_n$) manufactured by each piezoelectric device manufacturer 70. FIG. 6 shows one example of the data stored in the vendor server 92.

The client 94 (94a to 94n), a manufacturer of the receiver, such as the cellular telephone 10, purchases a piezoelectric device (SPXO 28) directly from the piezoelectric device manufacturer 70 or from the vendor 90, to be delivered with it, as shown in step S110, for example. The client 94a mounts the purchased piezoelectric device on the electronic appliances (cellular telephone 10) (step S111). Also, the client 94a, before or after mounting the piezoelectric device on the electronic appliances, reads the serial number indicated on the package of the piezoelectric device by a reader (not shown) having a CCD camera or the like. The reader makes an image processing, such as binarization, on the image of from the CCD camera, and forwards the read-out serial number of the piezoelectric device to the client computer 96a.

Input from the reader, the client computer 96a transfers the serial number to the manufacturer computer 72 or vendor server 92 through the communication network 76 as shown at the arrow 98, and outputs a transfer request for the characteristic data of the piezoelectric device corresponding to the serial number. The manufacturer's computer 72 or vendor server 92, received the data transfer request from the client computer 96a, searches through the memory and reads out the sent characteristic data corresponding to the serial number, and transfers it to the client computer 96a through the communication network 76, as shown at the arrow 100. The client computer 96a, receives the characteristic data, writes the characteristic data to the storage section of the electronic appliance mounted with a piezoelectric device (step S113). Namely, the client computer 96a writes the SPXO 28 characteristic data to the memory 60 of the cellular telephone 10. The electronic appliance thus written with the characteristic data undergoes the final product test followed by shipment, as shown at step S114. Writing the characteristic data at step S113 may be by outputting the characteristic data from the client computer 96a to a not-shown data writer and carried out by the data writer. The characteristic data corresponding to the SPXO serial number may be previously transferred to the client computer 96a on a customer-by-customer or lot-by-lot basis.

In this manner, the manufacturing method for a receiver in the exemplary embodiment, because of making use of the characteristic data which the piezoelectric device manufacturer 70 has acquired in the manufacturing process, can manufacture a receiver (cellular telephone 10) smoothly and swiftly. Moreover, because the characteristic data of the piezoelectric device is directly written to the memory of an electronic appliance, the piezoelectric device can be made small in size. This makes it possible to meet the client's requirement of size reduction.

The cellular telephone 10 of the exemplary embodiment operates as follows. The cellular telephone 10, when its GPS function is selected by the keyboard section 16, the control section 14 reads the program to operate the GPS receiving section 20 out of the memory 60 and starts the GPS receiving section 20. Then, the control section 14 computes a frequency deviation by the use of an approximate expression, on the basis of the temperature information from the temperature sensor and the temperature characteristic data stored in the memory 60 (coefficient data of a frequency-temperature characteristic). Based on the frequency deviation information, the receiving synthesizer 26 is controlled to make an input to the mixer/filter/amplifier section 24.

The signal processing section 27 carries out a process of capturing a positioning signal from the satellite, by the utilization of the frequency deviation information from the control section 14, the reference signal from the SPXO 28 and the intermediate frequency signal output from the mixer/filter/amplifier section 24. After capturing the satellite, the control section 14 determines a current position of the cellular telephone 10, on the basis of the information of a distance (pseudo distance) between the GPS satellite transmitting the positioning signal and the cellular telephone 10. Thus, a positioning result is output onto the display section 18, or the memory 60 is searched and the corresponding map information is read out and displayed on the display section 18.

The cellular telephone section 40 of the cellular telephone 10 operates as follows. The RF signal from a cellular-telephone base station (not shown) is passed through the antenna 12 and amplifier/filter 46 and frequency-converted at the receiving section 42, and thereafter converted into a audio signal in the demodulator CODEC section 48 and then output from the speaker 54. The caller's voice is converted into an electric signal by the microphone 52 is, digital-modulated by the demodulator/CODEC section 48 converted into an RF frequency by the transmitting section 44, and then sent to the cellular-telephone base station (not shown) through the antenna 12. The control programs and user information, such as telephone directory and history information, for use in the operation are stored in the memory 60.

Incidentally, the system to acquire piezoelectric-device characteristic data through the communication network 76 shown in FIG. 4 allows for such a utilization method by the client 94b. Specifically, the client 94b, after purchasing a piezoelectric device from the piezoelectric device manufacturer 70 or vendor 90 (step S120), mounts it on an electronic appliance. When conducting a characteristic test on the performance of the electronic appliance (step S121), a problem, such as quality abnormality, assumably occurs (step S122). In such a case, the client 94b reads out, by the reader, the serial number indicated on the package of the piezoelectric device similar to the foregoing (step S123) and inputs it to the customer computer 96b. The client computer 96b outputs a transfer request for the received serial number and characteristic data to the manufacturer computer 72 or vendor server 92 through the communication network 76 as shown at the arrow 98. And, the client 94b receives characteristic data and the like through the communication network 76 as at the arrow 100 (step S124), and utilize data to analyze the cause of the electronic appliance problem encountered, quality abnormality or poor characteristic.

Figure 7:
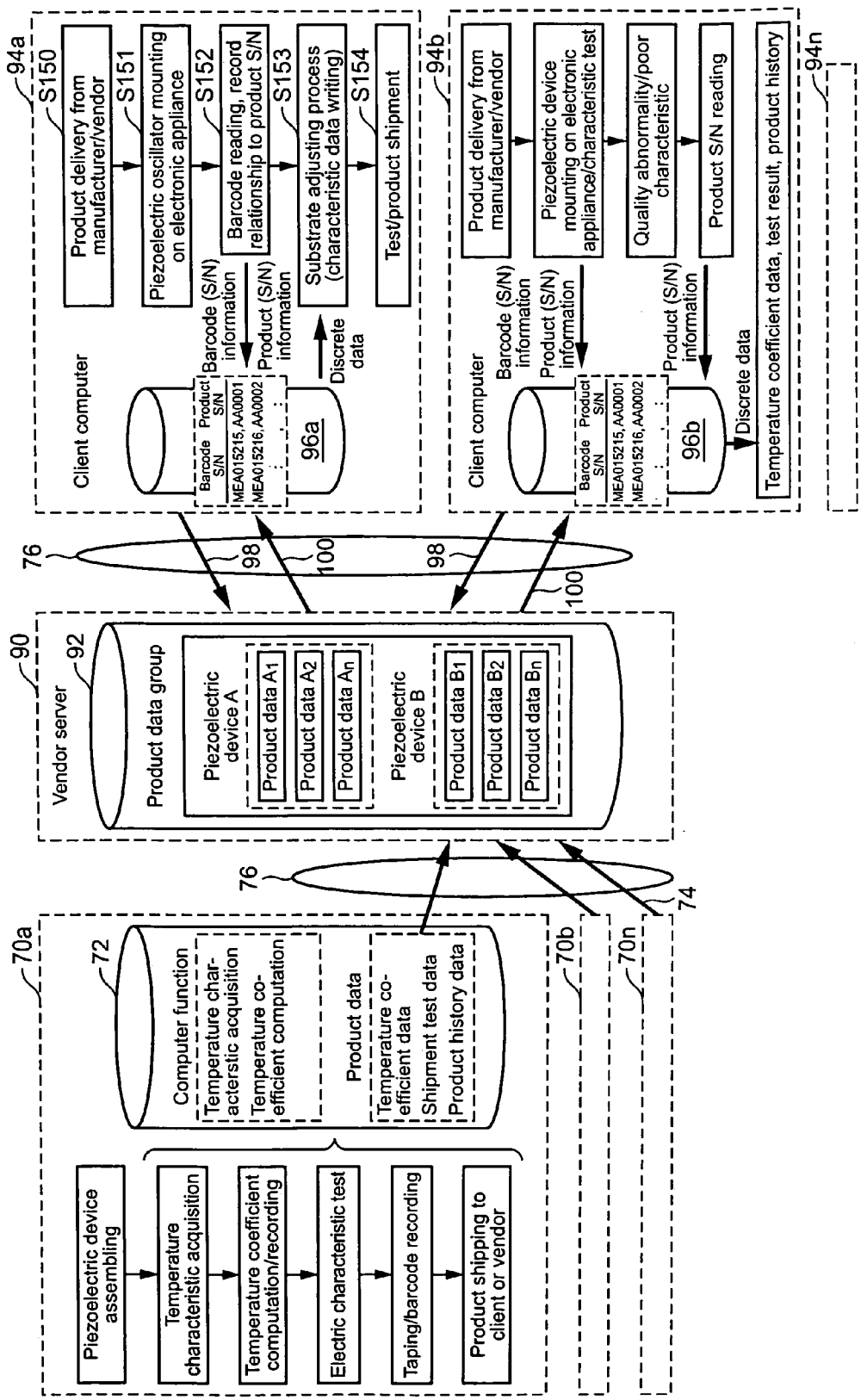
FIG. 7 is a schematic explaining a manufacturing method for a receiver according to another exemplary embodiment.

FIG. 7 is a schematic explaining a manufacturing method for a receiver according to another exemplary embodiment.

Figure 8A:
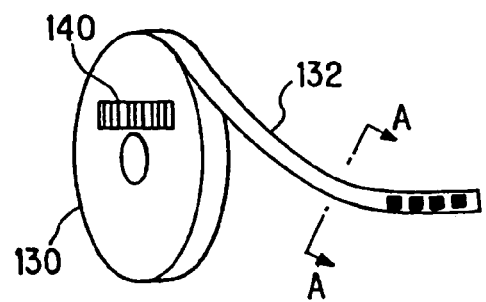
FIGS. 8(A)–8(C) are schematics explaining a shipment form of a piezoelectric device according to an exemplary embodiment.
Figure 8B:
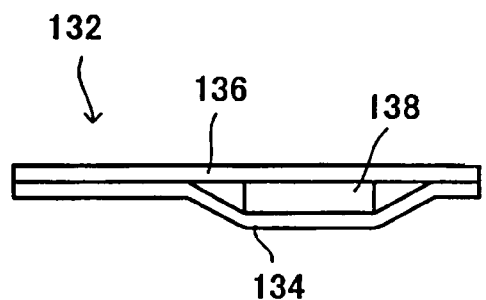
Figure 8C:
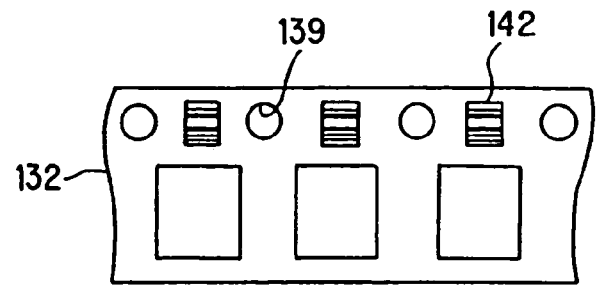

This exemplary embodiment is to be applied where the piezoelectric device has a barcode identification marker. The piezoelectric device manufacturer 70 usually ships a piezoelectric device in a state held by a wrapping tape 132 and wound round over a reel 130, as shown in FIG. 8(A). Specifically, the wrapping tape 132 is formed by a thin base tape 134 of plastic and a top tape 136, as shown in FIG. 8(B) as a sectional view taken along plane A—A in FIG. 8(A). The piezoelectric device 138 is sandwiched between the base tape 134 and the top tape 136. The wrapping tape 132 is formed with sprocket holes 139 along one side thereof, as shown in FIG. 8(C) as a fragmentary magnifying view. The wrapping tape 132, in a place of purchase, is loaded on a mounting machine called a mounter. The mounter withdraws the wrapping tape 132 from the reel 130, and takes out the piezoelectric device 138 while stripping the top tape 136 off the base tape 134 and mounts it onto an electronic appliance.

Figure 9:
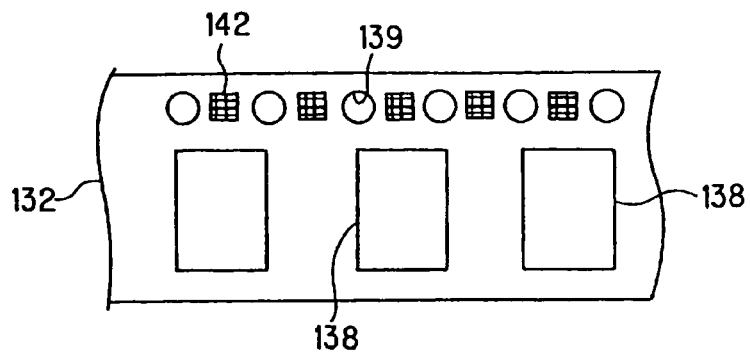
FIG. 9 is a schematic showing another example of a barcode.
Figure 10:
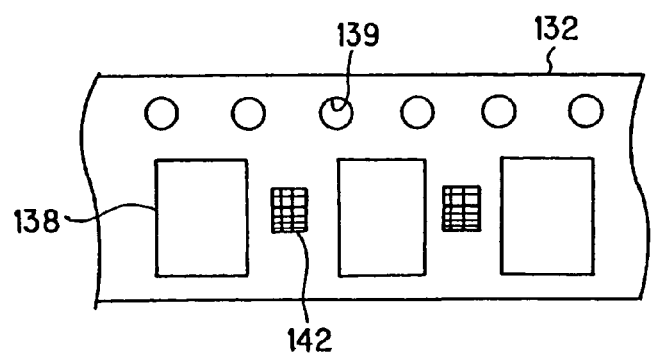
FIG. 10 is a schematic explaining a position for providing a barcode.
Figure 11:
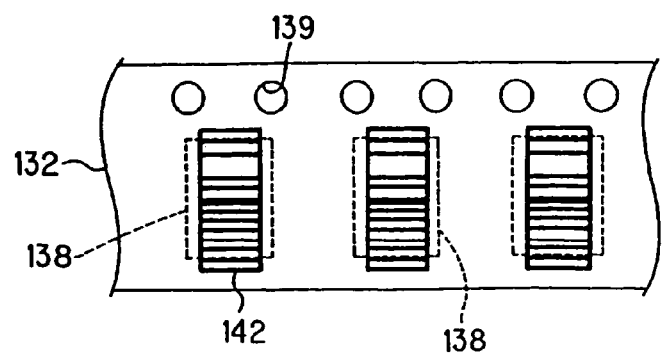
FIG. 11 is a schematic explaining another position for providing a barcode.

For this reason, the piezoelectric device manufacturer 70, when shipping the piezoelectric device 138 by wrapping, makes an indication of manufacture lot, etc. onto the reel 130 by a barcode 140 as shown in FIG. 8(A), and further makes an indication of serial number (S/N) corresponding to each piezoelectric device 138 onto the wrapping tape 132 by a barcode 142 as shown in FIG. 8(C). The barcode 142 may be a one-dimensional barcode as shown in FIG. 8 or a two-dimensional barcode as shown in FIG. 9. Meanwhile, the barcode 142 may be provided in a position between each piezoelectric device 138 or on each piezoelectric device 138 as shown in FIGS. 10 and 11 between the sprocket holes 139.

The piezoelectric device manufacturer 70, when shipping the piezoelectric devices 138 with a barcode 142 on a wrapping tape 132 to the vendor 90, transfers the characteristic data, manufacturing history data, etc. of each piezoelectric device 138 corresponding to serial numbers thereof to the vendor server 92 similar to the foregoing. The client 94a mounts a delivered piezoelectric device 138 on an electronic appliance (steps S150, S151). Then, the barcode 142 placed on the wrapping tape 132 is read out by a not-shown barcode reader (step S152). The read-out serial number is input to the client computer 96a. The client computer 96a receives the characteristic data corresponding to the serial number through the communication network 76 similar to the foregoing, and writes it to the memory of the electronic appliance (step S153). Thereafter, the client 94a, after examining the electronic appliance, ships the product (step S154). This can provide the effect similar to the foregoing.

In the event of a problem occurring on the electronic appliance built therein with a piezoelectric device 138 as the client 94b of FIG. 7, a serial number is read from the barcode 142. The characteristic data and the data of manufacturing history, etc. corresponding to the serial number are acquired through the communication network 76, which can be utilized in problem cause analysis on the electronic appliance.

The client 94 may acquire characteristic data of a piezoelectric device 138 through a recording medium and write it to the memory of an electronic appliance, such as a receiver. Specifically, the piezoelectric device manufacturer 70 writes the serial number identifying each piezoelectric device 138 as a barcode 142 onto a wrapping tape 132. Also, the piezoelectric device manufacturer 70 records the characteristic data and the manufacturing history data, etc. of each piezoelectric device 138 onto a recording medium (not shown) to be read by a computer, such as a flexible disc, a CD-ROM, a DVD-ROM or a memory card using a nonvolatile memory, to sell the recording medium attached to the piezoelectric device 138. The client 94, when mounting the piezoelectric device 138 onto an electronic appliance, reads a serial number of the piezoelectric device 138 from the barcode 142 put on the wrapping tape 132, to read the characteristic data of the piezoelectric device 138 corresponding to the serial number from the recording medium and writes it to the memory of the electronic appliance built with the piezoelectric device 138. In this case, it is possible to obtain an effect similar to the foregoing.

Although the above exemplary embodiment describes a case that the receiver is a digital cellular telephone 10, the receiver may be a GPS receiver or another communication apparatus. Although the above exemplary embodiment describes a case that the piezoelectric device is the SPXO 28 made by an AT resonator, the piezoelectric device may be a tuning fork type resonator, SAW (Surface Acoustic Wave) or any other suitable device.

What is claimed is:

1. A method to manufacture a receiver incorporating a piezoelectric device, comprising:
    storing characteristic data of a plurality of piezoelectric devices in a server, corresponding to identifying markers associated with each piezoelectric device; and
    reading the identifying marker when the piezoelectric device is assembled in a receiver, and receiving the corresponding characteristic data from the server through a communication network depending upon a read-out identifying marker and writing the characteristic data in a storage section of the receiver.

2. A method to manufacture a receiver incorporating a piezoelectric device, comprising:
    acquiring a recording medium recording characteristic data of a plurality of piezoelectric devices corresponding to identifying markers associated with each piezoelectric device, together with the piezoelectric devices; and
    reading the identifying marker when the piezoelectric device is assembled in a receiver, and reading the characteristic data corresponding to the read-out identifying marker from the recording medium and writing the characteristic data in a storage section of the receiver.

3. The method to manufacture a receiver according to claim 1, the characteristic data being acquired during manufacturing the piezoelectric device.

4. The method to manufacture a receiver according to claim 1, the server being set up at a vendor for the piezoelectric device, the characteristic data being acquired during manufacturing the piezoelectric device and sent corresponding to the identifying marker to the server through the communication network.

5. A receiver manufactured by the method according to claim 1.

* * * * *